United States Patent [19]
Percebois et al.

[11] Patent Number: 5,058,907
[45] Date of Patent: Oct. 22, 1991

[54] PIPE JOINT GASKET WITH ANNULAR ANCHORING HEEL

[75] Inventors: Alain Percebois; Andre Remy; Jean-Pierre Vitel, all of Blenod les Pont-A-Mousson, France

[73] Assignee: Pont-A-Mousson S.A., Nancy, France

[21] Appl. No.: 545,151

[22] Filed: Jun. 28, 1990

[30] Foreign Application Priority Data

Jun. 28, 1989 [FR] France ............... 89 08858

[51] Int. Cl.$^5$ ........................... F16L 21/04
[52] U.S. Cl. .................. 277/207 A; 277/215; 277/DIG. 2; 285/230; 285/231; 285/910
[58] Field of Search ............ 277/207 A, 9, 207 R, 277/215, DIG. 2; 285/230, 231, 910

[56] References Cited

U.S. PATENT DOCUMENTS

| | | | |
|---|---|---|---|
| 2,889,183 | 6/1959 | Peras | 277/207 |
| 2,966,539 | 12/1960 | Sears et al. | 272/207 A |
| 3,423,141 | 1/1969 | Pethis | 277/9 |
| 3,899,183 | 8/1975 | Wild et al. | 277/DIG. 2 |
| 4,078,813 | 3/1978 | Bram | 277/207 A |
| 4,114,657 | 9/1978 | Langenfeld | 277/DIG. 2 |
| 4,275,909 | 6/1981 | Yoshizawa et al. | 285/231 |
| 4,540,204 | 9/1985 | Battle et al. | 285/231 |
| 4,546,987 | 10/1985 | Bucher et al. | 277/207 A |

FOREIGN PATENT DOCUMENTS

| | | | |
|---|---|---|---|
| 0002071 | 11/1978 | European Pat. Off. | 277/207 A |
| 1329061 | 4/1963 | France . | |
| 2013548 | 4/1970 | France . | |
| 2094972 | 2/1972 | France . | |
| 2512917 | 3/1983 | France . | |
| 2557667 | 7/1985 | France . | |

*Primary Examiner*—William A. Cuchlinski, Jr.
*Assistant Examiner*—James K. Folker
*Attorney, Agent, or Firm*—Sughrue, Mion, Zinn, Macpeak and Seas

[57] ABSTRACT

An annular gasket 1 for sealing joints between male and female socket pipes has an anchoring structure 2 and a sealing body 3, the anchoring structure having an anchoring heel 5 provided with outer peripheral recesses 27.

5 Claims, 3 Drawing Sheets

PIPE JOINT GASKET WITH ANNULAR ANCHORING HEEL

BACKGROUND OF THE INVENTION

This invention relates to a gasket, made from a single-hardness elastomer, for sealing joints between male and female socket pipes, having a compression body and an annular anchoring heel projecting from the radial outer surface of the gasket.

Such a gasket must be radially compressed between the inner surface of the female socket of one of the pipes to be connected and the outer surface of the male end of the other pipe. In order to properly position the gasket in the socket it must be bent, which in certain cases is very difficult due to the natural stiffness of the gasket. A gasket of this type must also be able to make a perfect seal as a function of the dimensional tolerances of the pipes to be connected, the eccentricity of one pipe relative to the other, and the pressure of the fluid circulating in the duct.

A gasket of this type is disclosed in commonly assigned U.S. Pat. No. 4,546,987 in which the anchoring heel is extended, in the radially inward direction relative to the inner surface of the gasket, by an annular compression foot. Although a gasket of this type effectively enables a satisfactory seal to be made, it has been found that, due to its stiffness which makes it difficult to bend, it is difficult and awkward to position in the socket in which it is intended to be mounted, in particular in the case of pipes with small diameters of less than 250 mm.

SUMMARY OF THE INVENTION

An object of the invention is thus to provide a gasket having a heel for anchoring the gasket in a female socket, and which enables the gasket t o be easily positioned in the socket in which it is intended to be housed.

This object is implemented by an elastomeric gasket intended to be mounted in a socket of a pipe, the gasket having an anchoring structure and a sealing body functioning by radial compression, the anchoring structure consisting of an anchoring heel situated on a radially outer face of the gasket and forming a radial projection relative to the latter, and recesses being provided on a radial outer surface of the gasket in the anchoring heel.

DETAILED DESCRIPTION OF THE PREFERRED EMBODIMENTS

Figure 1:
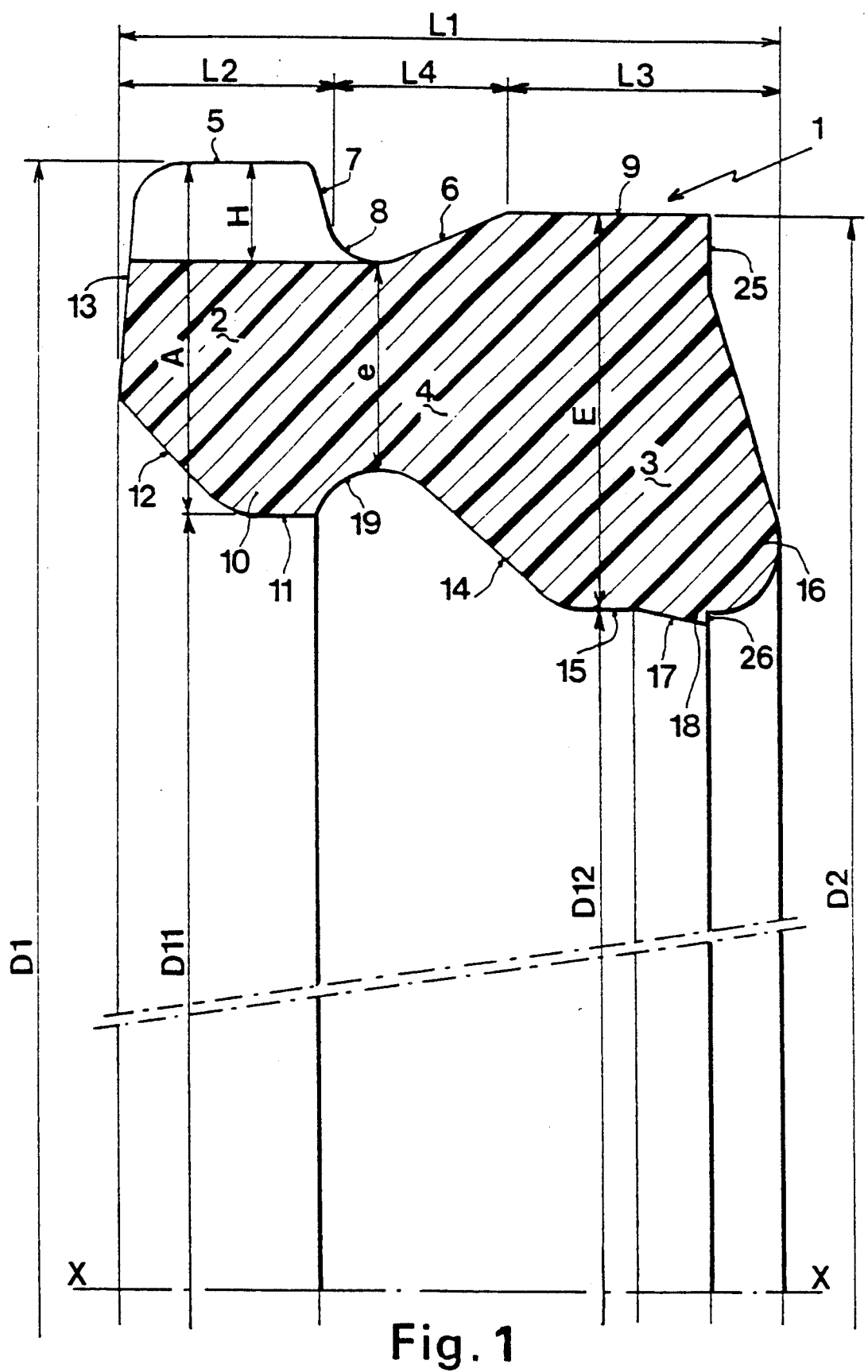
FIG. 1 shows a partial view in axial cross-section of a gasket according to the invention.

As can be seen in FIG. 1, a gasket 1 with axis X—X according to the invention has an anchoring structure 2 of axial length L2 and a sealing body 3 of axial length L3 extending the anchoring structure along the axis, an intermediate joining structure 4 of axial length L4 connecting the anchoring structure to the sealing body. The axial length L2 of the anchoring structure 2 represents from 25% to 35% of the total axial length L1 of the gasket 1, and the volume of the anchoring structure represents between 25% and 35% of the total volume of the gasket 1.

The gasket 1 has a radially outer surface consisting of an anchoring heel 5 of the anchoring structure, with a cylindrical outer surface of diameter D1, connected to a frustoconical surface 6 of the joining structure 4 by a planar or slightly frustoconical face 7 with a conicity converging towards the sealing body 3, and a curved surface 8. The frustoconical surface 6 is extended, along the axis X—X, by a cylindrical surface 9 of the sealing body 3. As can be seen in FIG. 1, the surface 6 has a conicity open towards the sealing body 3, the surfaces 6, 7 and 8 forming a concave surface, and the surfaces 7 and 8 forming a cheek of height H and therefore of internal diameter equal to $D1-2H$. As can also be seen in FIG. 1, the diameter D2 of the cylindrical surface 9 of the sealing body is less than D1 and greater than $D1-2H$.

The gasket 1 has, on its inner surface, an annular foot 10 as a radial inner extension of the anchoring heel 5, in other words opposite the latter. This annular foot consists of a cylindrical inner surface 11 of diameter D11 and a frustoconical lead surface 12 connected to the anchoring heel 5 by a slightly frustoconical surface 13.

The sealing body 3 has, on its inner surface situated close to the annular foot 10, a frustoconical surface 14 with a half-angle at the peak of approximately 40° and with a conicity open towards the anchoring structure 2, followed by a second cylindrical inner surface 15 of internal diameter D12 terminating in a frustoconical surface 17 with a half-angle at the peak of 10° to 20° and with conicity open towards the anchoring structure. The internal diameter D12 of the inner surface 15 is less than the diameter D11 of the surface 11 of the annular foot 10.

The transverse face of the end of the sealing body 3 opposite the face 13 of the anchoring structure has an axially projecting lobe 16 and two faces 25 and 26 flanking the lobe 16. The surface 26 forms, with the surface 17, a small triangular lip 18. The surface 25, which is planar or slightly frustoconical, is connected to the cylindrical outer face 9 of the sealing body 3.

An annular groove 19 situated between the foot 10 and the sealing body 3 on the inner surface of the gasket joins the inner surface 11 of the foot to the frustoconical inner surface 14 of the sealing body, and forms the radial inner limit of the joining structure 4.

As can be seen in FIG. 1, the ridge formed by the surface 11 of the foot and the annular groove 19 is situated at right angles to the surface 7 limiting the anchoring heel 5 laterally.

The ratio between the minimum thickness e of the gasket, at right angles to the groove 19 and the curved surface 8, and the height H of the anchoring heel 5 is between 1.3 and 2.5. More particularly, the ratio between the height H of the anchoring heel and the thickness E of the sealing body must be greater than 0.2 so that the anchoring effect ensured by the heel, in combination with the annular foot 10, remains sufficient. The ratio H/E is preferably between 0.25 and 0.38.

Moreover, so that reasonable degrees of compression of the gasket are respected, which therefore prevents the elastomer of the gasket from prematurely aging, while at the same time ensuring an effective seal within the range of tolerances which the gasket must absorb, it has been shown that if A represents the thickness of the gasket at right angles to the heel 5 and the foot 10, on the one hand the ratio A/E must be between 0.80 and 1, preferably between 0.85 and 0.95 and, on the other hand, the ratio (D11 - D12)/2E must be greater than 0.18, and preferably between 0.2 and 0.3.

Figure 2:
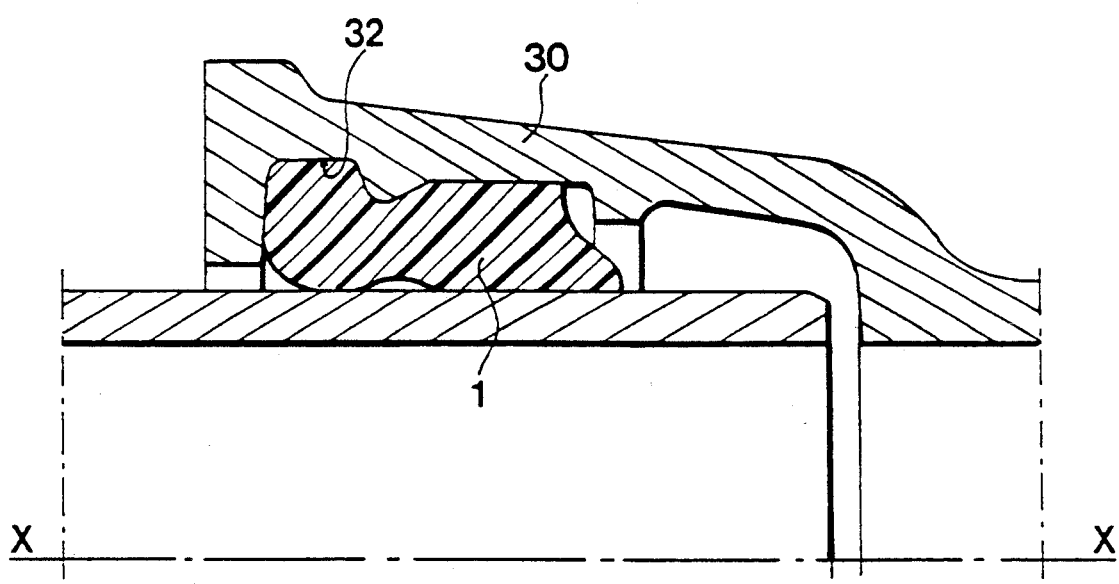
FIG. 2 shows a sealed joint consisting of a male pipe end, a female socket and a gasket according to the invention.

As can be seen in FIG. 2, a gasket 1 of the type described above is intended to be mounted inside a female socket 30 with axis X—X of a pipe to be connected. The anchoring heel 5 is housed in a groove 32 of the socket, the surfaces 6, 7, 8 and 9 of the gasket 1 coming into contact with corresponding surfaces of the socket 30.

In order to mount the gasket in its socket, the gasket is bent, for example by hand or by a portable or non-portable tool until it has been deformed sufficiently to permit it to be introduced into the socket. The gasket generally undergoes a cardioid deformation, in other words in the form of two lobes separated by an invagination. In particular, if it is desired to position a gasket of the type described by hand in a socket, the gasket has a stiffness which makes this operation very difficult.

It has thus been found that, without modifying the performance of the gasket, it is possible to obtain a reduction in the stiffness of the gasket by providing, on its outer surface in the anchoring heel 5, a plurality of spaced recesses 27, open on the outer surface and hollowed out over the entire axial length of the heel.

Figure 3:
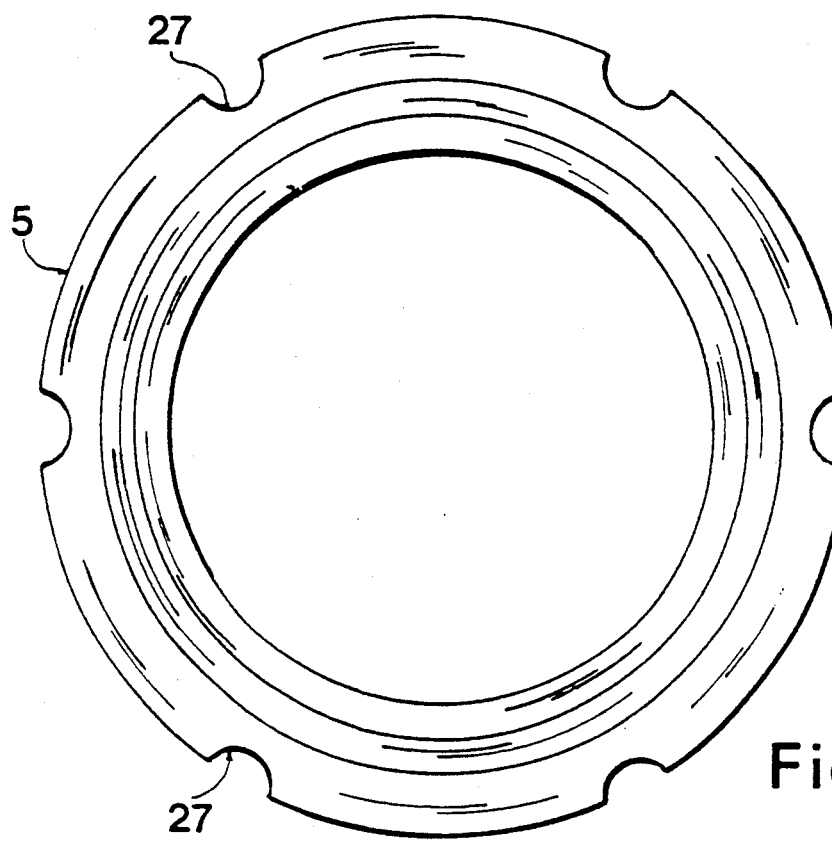
FIG. 3 is a schematic end view of the gasket according to the invention.

According to the preferred embodiment of the invention, as shown in FIGS. 1 and 3, each recess 27 has a depth which may go up to the height H of the heel 5 and is preferably greater than 0.66H. Moreover, as shown in FIG. 3, each recess 27 has, in a plane perpendicular to the axis X—X of the gasket, a cross-section in the shape of an arc of a circle. Lastly, in order to permit a sufficient reduction in the stiffness of the gasket, at least three recesses 27 should be provided, distributed regularly on the periphery of the anchoring heel 5, these recesses numbering six in the embodiment shown in FIG. 3.

Figure 4:
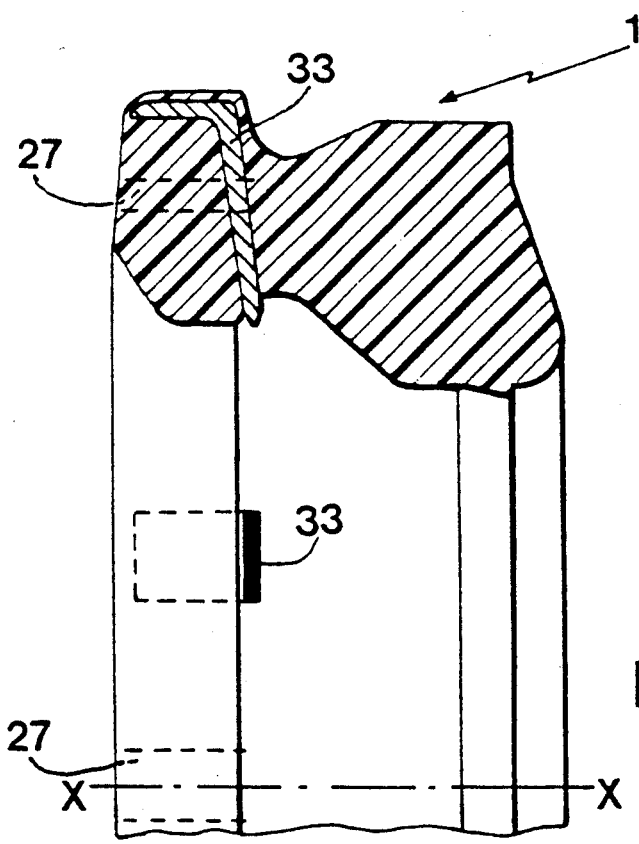
FIG. 4 shows an alternative of the gasket according to the invention.

According to the alternative illustrated in FIG. 4, the gasket according to the invention is provided with metal inserts 33 for locking the male end of a pipe into the female socket. A gasket is disclosed in French patent document No. 2,621,376 which has a heel for anchoring the gasket in the socket and in which regularly distributed locking elements consisting of metal inserts pass radially through the gasket at the level of the anchoring heel. It has been found, however, that when a gasket of this type is being positioned, in addition to the stiffness problem mentioned above, the inserts 33 tend to come apart from the gasket when it is bent. This phenomenon is particularly marked in the radially outer zones of the gasket which are tensioned when it is bent.

The recesses 27 of the gasket according to the present invention, while enabling the stiffness of the gasket to be reduced, also enable the stresses to be concentrated in the region of the recesses, hence considerably reducing these stresses, and in particular the tension in the region of the contact surfaces between the locking inserts 33 and the elastomer forming the gasket which surrounds them. The separation phenomenon described above is thus prevented.

The present invention therefore enables a gasket to be produced having an anchoring heel and a sealing body functioning by radial compression which has a stiffness which is less than in the prior art while at the same time making a perfect seal.

We claim:

1. An annular elastomeric gasket (1) adapted to be mounted in a female end socket (30) of a pipe, comprising, in radial cross-section: an anchoring structure (2), a radially compressible sealing body (3) axially spaced from and integrally connected to the anchoring structure by an intermediate joining structure (4), the anchoring structure having an integral anchoring heel (5) defining a radially outermost face of the gasket and forming a radial projection thereof, said projection extending outwardly from a level corresponding to an outer peripheral surface of said intermediate joining structure and a plurality of circumferentially spaced, deformation implementing recesses (27) provided on said radial outermost face of the gasket and extending axially therethrough to facilitate a cardioid deformation of the gasket to enable its insertion in a female pipe socket.

2. A gasket according to claim 1, wherein the ratio between a radial height H of said outwardly extending projection and a radial thickness E of the sealing body is greater than 0.2.

3. A gasket according to claim 2, wherein at least three regularly distributed recesses (27) are provided on an outer periphery of the anchoring heel.

4. A gasket according to claim 3, further comprising an annular foot (10) on an inner surface of the anchoring structure defining a radial inner extension of the anchoring heel.

5. A gasket according to claim 1, wherein each recess has a radial depth greater than 0.66H, where H is a radial height of said outwardly extending projection.

* * * * *